No. 803,658. PATENTED NOV. 7, 1905.
A. S. ALLEN.
CYCLE TIRE.
APPLICATION FILED SEPT. 9, 1904.

Witnesses:
Fred S. Greenleaf
S. Wm. Lutton

Inventor.
Arthur S. Allen,
by Crosby & Gregory
Attys.

UNITED STATES PATENT OFFICE.

ARTHUR S. ALLEN, OF BROOKLINE, MASSACHUSETTS.

CYCLE-TIRE.

No. 803,658.        Specification of Letters Patent.        Patented Nov. 7, 1905.

Application filed September 9, 1904. Serial No. 223,819.

*To all whom it may concern:*

Be it known that I, ARTHUR S. ALLEN, a citizen of the United States, residing at Brookline, county of Norfolk, State of Massachusetts, have invented an Improvement in Cycle-Tires, of which the following description, in connection with the accompanying drawings, is a specification, like letters on the drawings representing like parts.

This invention has for its object the production of a novel tire for use with automobiles, bicycles, and the like.

Heretofore many attempts have been made to render bicycle-tires puncture-proof, and for this purpose wire and sheet metal have been made into so-called "mail," variously enchained and embedded in the india-rubber constituting the body of the tire, and when wire was used the wire has usually been of such diameter as to add very materially to the stiffness of the tire, increasing its weight and lessening its resiliency.

In my study to provide an improved tire I have produced a flexible semimetallic fabric composed of connected wire coils and a filling material embedded in the interstices of the wire, and I have embedded this fabric into the body of the india-rubber constituting the tire, vulcanizing the same in position in the body of the tire. The metallic fabric referred to possesses very considerable resiliency and is so disposed in the body of the tire as to help keep the tire, which is preferably of the class capable of being inflated, in its working position.

Figure 1:
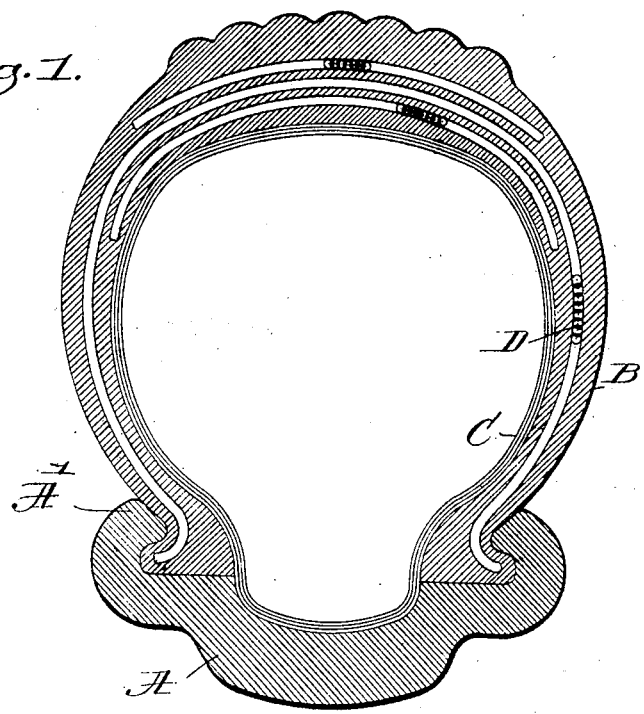
Figure 2:
Figure 3:
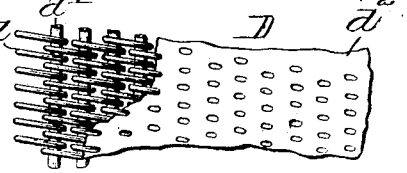

Figure 1 shows a section of a wheel-rim with my novel tire in position. Fig. 2 shows the semimetallic fabric with the wire coils enlarged and with the filling applied to the interstices between the coils of wire, and also the locking means, as a cord or wire, uniting the edges of the coils after the same have intermeshed. Fig. 3 is a plan view of Fig. 2 with the filling removed from a part of the wire coils to illustrate more fully how the wire coils are connected.

The rim A, having lips A' to be engaged by the hooked edges of the body B of the tire, and the inner tube C, which is capable of being inflated, are and may be all as usual.

My improvements relate wholly to the body of the tire and consist in applying within said body my novel semimetallic flexible fabric, which I will now describe.

The fabric D employed by me and embedded in the tire is composed of wire, preferably in the form of coils $d$, laid parallel and having their coils intermeshed by shoving one coil of wire into the other laterally, the coils being united by means of locking means, shown as cords or wires $d'$, and a filling $d^2$ of a yielding or plastic material applied to the connected wire coils to fill the interstices between said wire coils. This filling will preferably contain india-rubber or like material that when applied as described and vulcanized will leave a fabric with substantially level sides that may be embedded in the india-rubber constituting the body of the tire and be incorporated therein by the process of vulcanization.

The portion of the semimetallic fabric that is located in the part of the tread of the tire, or that part which runs directly upon the ground, may be provided with a filling containing a compound of india-rubber, which when vulcanized will become harder than the other portions of said fabric running through the inner and outer sides of the tire between the tread-face and the wheel-rim.

Fig. 1 shows the body of the tire as having three layers of wire coil intermeshed and incorporated with the body of the tire. In the central layer the fabric is shown as extended substantially about the tire from one to its opposite edge, while the fabric in the outer layer or tread overlaps the central layer.

Having described my invention, what I claim as new, and desire to secure by Letters Patent, is—

1. A tire comprising a body of india-rubber containing a fabric composed of intermeshed wire coils and locking means to retain the coils in their intermeshed condition.

2. A tire comprising a body of india-rubber containing a fabric composed of wire coils and a filling applied to the interstices between the wire coils and vulcanized before being applied to the body of the tire, the filling of said fabric being vulcanized with the wire into the body of the tire.

In testimony whereof I have signed my name to this specification in the presence of two subscribing witnesses.

ARTHUR S. ALLEN.

Witnesses:
     MAUD R. O'CONNOR,
     K. J. GARRITY.